(12) United States Patent
Chen

(10) Patent No.: US 9,190,931 B2
(45) Date of Patent: Nov. 17, 2015

(54) LOAD DRIVING CIRCUIT AND METHOD THEREOF

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/467,260

(22) Filed: Aug. 25, 2014

(65) Prior Publication Data

US 2015/0062987 A1 Mar. 5, 2015

(30) Foreign Application Priority Data

Aug. 29, 2013 (CN) .......................... 2013 1 0385826

(51) Int. Cl.
| | |
|---|---|
| G05F 1/00 | (2006.01) |
| H02M 7/217 | (2006.01) |
| H02M 1/32 | (2007.01) |
| H02M 1/00 | (2007.01) |

(52) U.S. Cl.
CPC ................ *H02M 7/217* (2013.01); *H02M 1/32* (2013.01); *H02M 2001/0009* (2013.01); *Y02B 20/42* (2013.01)

(58) Field of Classification Search
CPC ........... H05B 33/0815; H05B 33/0851; H05B 33/0845; H05B 37/02; H05B 39/04; H02M 7/06

USPC ................ 315/121–122, 127–128, 294, 297; 363/81, 84, 108, 125–127
See application file for complete search history.

(56) References Cited

U.S. PATENT DOCUMENTS

| | | | | |
|---|---|---|---|---|
| 4,412,277 | A * | 10/1983 | Mitchell | 363/81 |
| 4,447,868 | A * | 5/1984 | Turnbull | 363/81 |
| 6,038,155 | A * | 3/2000 | Pelly | 363/129 |
| 7,269,038 | B2 * | 9/2007 | Shekhawat et al. | 363/71 |
| 8,014,118 | B2 | 9/2011 | Ikegami et al. | |
| 2002/0012261 | A1* | 1/2002 | Moindron | 363/127 |
| 2009/0122582 | A1* | 5/2009 | Ye et al. | 363/89 |
| 2012/0300519 | A1* | 11/2012 | Clemmons et al. | 363/127 |
| 2013/0002159 | A1 | 1/2013 | Chen et al. | |
| 2013/0175936 | A1 | 7/2013 | Chen | |
| 2013/0181626 | A1 | 7/2013 | Chen | |

* cited by examiner

*Primary Examiner* — Adolf Berhane
*Assistant Examiner* — Henry Lee, III
(74) *Attorney, Agent, or Firm* — Michael C. Stephens, Jr.

(57) ABSTRACT

In one embodiment, a method of driving a load can include: monitoring an AC input to a rectifier circuit in real-time, where the rectifier circuit can include first and second rectifier circuits, and controlling first and second controllable switches based on a state of the AC input is in a first state. For example, a first state can include the AC input being in a positive half cycle and increasing, or the AC input being in the positive half cycle and decreasing while being at least as high as a predetermined threshold value. The AC input can be used to supply power to a load circuit and an output capacitor via the first rectifier circuit when the AC input is in the first state, where the first rectifier circuit can include a first diode and the second controllable switch.

19 Claims, 18 Drawing Sheets

LOAD DRIVING CIRCUIT AND METHOD THEREOF

RELATED APPLICATIONS

This application claims the benefit of Chinese Patent Application No. 201310385826.X, filed on Aug. 29, 2013, which is incorporated herein by reference in its entirety.

FIELD OF THE INVENTION

The present invention relates to the field of semiconductors/electronics, and more particularly to a load driving circuit and an associated method.

BACKGROUND

Light-emitting diodes (LEDs) are widely used as loads in various applications, such as landscape lighting, street lighting, backlighting for electronic products, etc., due to characteristics of energy-savings, high efficiency, and low cost, as compared to other lighting options. Typical LED driving power supplies are designed to be input by commercial power, and to provide DC current for LEDs by rectifying the commercial power to DC power, and then performing a step-up or step-down conversion to the DC power.

SUMMARY

In one embodiment, a method of driving a load can include: (i) monitoring an AC input to a rectifier circuit in real-time, where the rectifier circuit includes first and second rectifier circuits; (ii) turning off a first controllable switch and turning on a second controllable switch when the AC input is in a first state, where the first state includes the AC input being in a positive half cycle and increasing, or the AC input being in the positive half cycle and decreasing while being at least as high as a predetermined threshold value; (iii) using the AC input to supply power to a load circuit and an output capacitor via the first rectifier circuit when the AC input is in the first state, where the first rectifier circuit includes a first diode and the second controllable switch; (iv) turning on the first and second controllable switches and using the output capacitor to supply power to the load circuit when the AC input is in a second state, where the second state includes the AC input being in positive half cycle and decreasing to less than the threshold value; (v) turning on the first controllable switch and turning off the second controllable switch when the AC input is in a third state, where the third state includes the AC input being in a negative half cycle and having an absolute value increasing, or the AC input being in the negative half cycle and having the absolute value decreasing and at least as high as the threshold value; (vi) using the AC input to supply power to the load circuit and the output capacitor via the second rectifier circuit when the AC input is in the third state, where the second rectifier circuit includes a second diode and the first controllable switch; and (vii) turning on the first and second controllable switches and using the output capacitor to supply power to the load circuit when the AC input is in a fourth state, where the fourth state includes the AC input being in the negative half cycle and having an absolute value decreasing to be less than the threshold value.

In one embodiment, a load driving circuit can include: (i) an input capacitor coupled to an AC power supply and an AC input of a rectifier circuit, where the rectifier circuit includes first and second rectifier circuits; (ii) an output capacitor coupled to the rectifier circuit and a load circuit; (iii) a control circuit configured to turn off a first controllable switch and turn on a second controllable switch when the AC input is in a first state, where the first state includes the AC input being in a positive half cycle and increasing, or the AC input being in the positive half cycle and decreasing while being at least as high as a predetermined threshold value; (iv) the AC input being configured to supply power to a load circuit and an output capacitor via the first rectifier circuit when the AC input is in the first state, where the first rectifier circuit includes a first diode and the second controllable switch; (v) the control circuit being configured to turn on the first and second controllable switches and use the output capacitor to supply power to the load circuit when the AC input is in a second state, where the second state includes the AC input being in positive half cycle and decreasing to less than the threshold value; (vi) the control circuit being configured to turn on the first controllable switch and turn off the second controllable switch when the AC input is in a third state, where the third state includes the AC input being in a negative half cycle and having an absolute value increasing, or the AC input being in the negative half cycle and having the absolute value decreasing and at least as high as the threshold value; (vii) the AC input being configured to supply power to the load circuit and the output capacitor via the second rectifier circuit when the AC input is in the third state, where the second rectifier circuit includes a second diode and the first controllable switch; and (viii) the control circuit being configured to turn on the first and second controllable switches and use the output capacitor to supply power to the load circuit when the AC input is in a fourth state, where the fourth state includes the AC input being in the negative half cycle and having an absolute value decreasing to be less than the threshold value.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switching or switch regulators can be used to provide a stable voltage source or current source to supply various electrical systems or circuitry, such as for light-emitting diode (LED) drivers. A switching regulator can convert an input DC current into a high-frequency voltage, and then filter this high-frequency voltage for conversion into a DC output voltage or output current. Specifically, the switching regulator can include a switch device (e.g., a transistor), an output filter, and a controller (e.g., a pulse-width modulation [PWM] controller). The switch device or transistor can be alternatively connected to and disconnected from an input DC voltage source (e.g., a battery) to supply power to the load (e.g., an integrated circuit). Also, the output filter can be coupled between the input voltage source and the load, can include an inductor and a capacitor, and may be utilised for filtering the output of the switch device to provide the DC output voltage. The controller (e.g., PWM, frequency pulse regulator, etc.) can control a switch state of the switch device according to the state or level of the regulator output signal, so as to output a relatively stable DC voltage or DC current.

Figure 1:
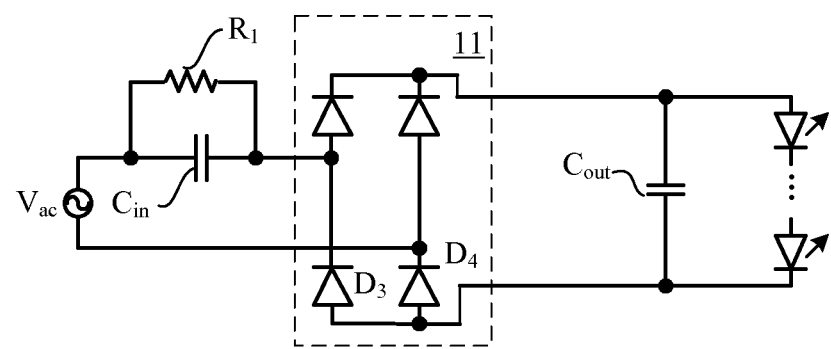
FIG. 1 is a schematic block diagram of an example load driving circuit.

Referring now to FIG. 1, shown is a schematic block diagram of an example load driving circuit. Here, the load can be one or more LEDs, and the schematic is an example of a capacitor-type step-down LED driving circuit. Due to capacitive reactance limiting current, AC power supply $V_{ac}$ can be stepped-down by input capacitor $C_{in}$ and may be input to rectifier bridge 11. Output capacitor $C_{out}$ can filter the DC voltage output by rectifier bridge 11, and the filtered DC voltage can be configured as an output voltage for the load circuit (e.g., LEDs). Resistor $R_1$ can be coupled in parallel with input capacitor $C_{in}$, and may serve as a discharging loop for input capacitor $C_{in}$ when the AC power supply is off.

However, in the capacitor-type step-down LED driving circuit of this particular example, the output current (e.g., LED driving current) may vary along with input capacitor $C_{in}$ and AC power supply $V_{ac}$, which can result in reduced stability of the brightness of the LEDs. Further, as the LED driving current is related to the capacitance of input capacitor $C_{in}$, when the capacitance of input capacitor $C_{in}$ becomes smaller due to usage losses, the LED driving current can also become smaller, which may also weaken the brightness of the LEDs. In addition, a capacitor-type step-down LED driving circuit as shown can have the output voltage reduced significantly when the load is increasing, possibly affecting operating stability of the LEDs. Also, the AC power supply is in an overvoltage condition, output capacitor $C_{out}$ may explode or otherwise be damaged in some cases. Additionally, without protection schemes like surge limitation, output short-circuit protection and output open-circuit protection, various security risks can also be of concern.

In one embodiment, a method of driving a load can include: (i) monitoring an AC input to a rectifier circuit in real-time, where the rectifier circuit includes first and second rectifier circuits; (ii) turning off a first controllable switch and turning on a second controllable switch when the AC input is in a first state, where the first state includes the AC input being in a positive half cycle and increasing, or the AC input being in the positive half cycle and decreasing while being at least as high as a predetermined threshold value; (iii) using the AC input to supply power to a load circuit and an output capacitor via the first rectifier circuit when the AC input is in the first state, where the first rectifier circuit includes a first diode and the second controllable switch; (iv) turning on the first and second controllable switches and using the output capacitor to supply power to the load circuit when the AC input is in a second state, where the second state includes the AC input being in positive half cycle and decreasing to less than the threshold value; (v) turning on the first controllable switch and turning off the second controllable switch when the AC input is in a third state, where the third state includes the AC input being in a negative half cycle and having an absolute value increasing, or the AC input being in the negative half cycle and having the absolute value decreasing and at least as high as the threshold value; (vi) using the AC input to supply power to the load circuit and the output capacitor via the second rectifier circuit when the AC input is in the third state, where the second rectifier circuit includes a second diode and the first controllable switch; and (vii) turning on the first and second controllable switches and using the output capacitor to supply power to the load circuit when the AC input is in a fourth state, where the fourth state includes the AC input being in the negative half cycle and having an absolute value decreasing to be less than the threshold value.

Figure 2:
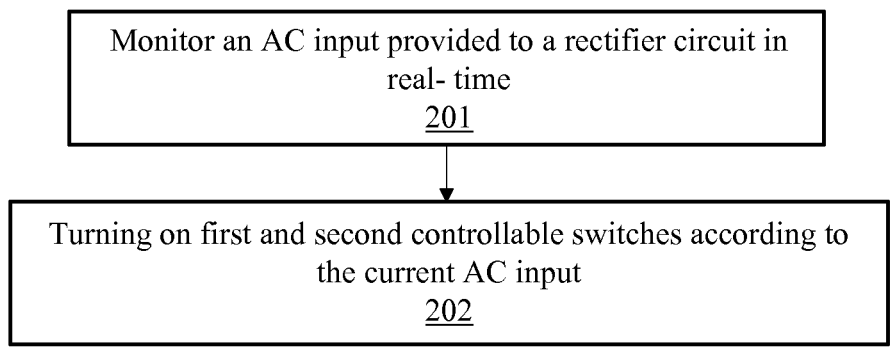
FIG. 2 is a flow diagram of an example load driving method, in accordance with embodiments of the present invention.

Referring now to FIG. 2, shown is a flow diagram of an example load driving method, in accordance with embodiments of the present invention. At 201, the AC input to a rectifier circuit can be monitored in real-time. For example, such monitoring can include obtaining the potential at nodes A and B in FIG. 3, to determine AC input $V_{AB}$ of rectifier circuit 301. At 202, controllable switches can be controlled (e.g., turning on/off) according to the present AC input, or particular state of the AC input.

In one embodiment, a load driving circuit can include: (i) an input capacitor coupled to an AC power supply and an AC input of a rectifier circuit, where the rectifier circuit includes first and second rectifier circuits; (ii) an output capacitor coupled to the rectifier circuit and a load circuit; (iii) a control circuit configured to turn off a first controllable switch and turn on a second controllable switch when the AC input is in a first state, where the first state includes the AC input being in a positive half cycle and increasing, or the AC input being in the positive half cycle and decreasing while being at least as high as a predetermined threshold value; (iv) the AC input being configured to supply power to a load circuit and an output capacitor via the first rectifier circuit when the AC input is in the first state, where the first rectifier circuit includes a first diode and the second controllable switch; (v) the control circuit being configured to turn on the first and second controllable switches and use the output capacitor to supply power to the load circuit when the AC input is in a second state, where the second state includes the AC input being in positive half cycle and decreasing to less than the threshold value; (vi) the control circuit being configured to turn on the first controllable switch and turn off the second controllable switch when the AC input is in a third state, where the third state includes the AC input being in a negative half cycle and having an absolute value increasing, or the AC input being in the negative half cycle and having the absolute value decreasing and at least as high as the threshold value; (vii) the AC input being configured to supply power to the load circuit and the output capacitor via the second rectifier circuit when the AC input is in the third state, where the second rectifier circuit includes a second diode and the first controllable switch; and (viii) the control circuit being configured to turn on the first and second controllable switches and use the output capacitor to supply power to the load circuit when the AC input is in a fourth state, where the fourth state includes the AC input being in the negative half cycle and having an absolute value decreasing to be less than the threshold value.

Figure 3:
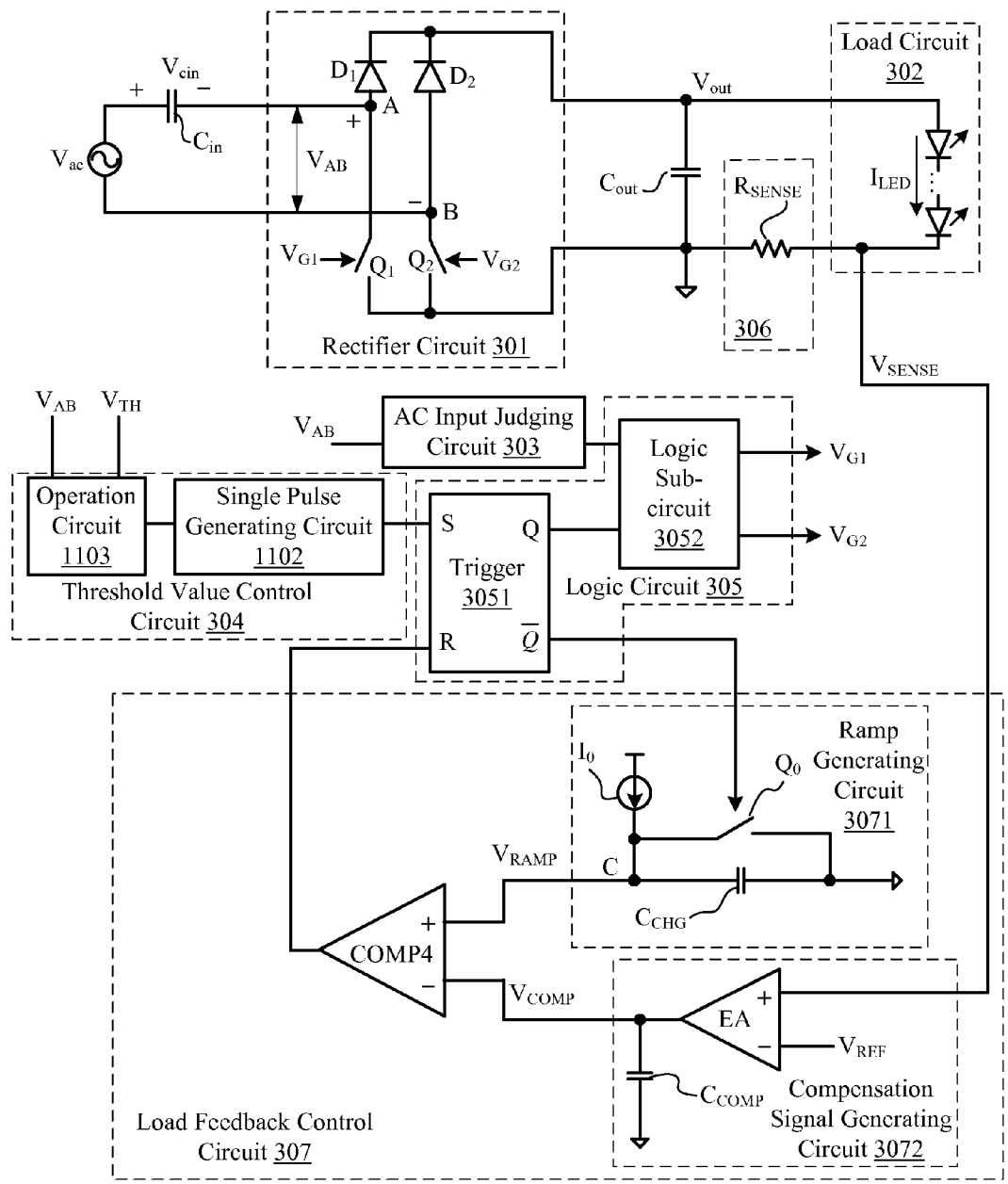
FIG. 3 is a schematic block diagram of an example load driving circuit in accordance with embodiments of the present invention.

Referring now to FIG. 3, shown is a schematic block diagram of an example load driving circuit in accordance with embodiments of the present invention. The load or load circuit as described herein can be an LED circuit (e.g., one or more LEDs) or any other suitable loads. Power can be supplied to load circuit 302 by converting an external AC current to a DC current via rectifier circuit 301. For example, rectifier circuit 301 can include "first" and "second" rectifier circuits, where the first rectifier circuit can include series-coupled diode $D_1$ and controllable switch (e.g., transistor) $Q_1$, and the second rectifier circuit can include series-coupled diode $D_2$ and controllable switch (e.g., transistor) $Q_2$. The input terminal of rectifier circuit 301 can be series-coupled with an input capacitor, and the output terminal thereof can be coupled to load circuit 302, which can be coupled in parallel with output capacitor $C_{out}$.

In rectifier circuit 301, the anode of diode $D_1$ can connect to the positive terminal of the AC input and a terminal of controllable switch $Q_1$ at node A. The cathode of diode $D_1$ can connect to the cathode of diode $D_2$, one terminal of output capacitor $C_{out}$ and the positive terminal of load circuit 302. The anode of diode $D_2$ can connect to the negative terminal of the AC input and a terminal of controllable switch $Q_2$ at node B, terminals of controllable switches $Q_1$ and $Q_2$ and a terminal of output capacitor $C_{out}$ can be coupled to the negative terminal of load circuit 302. Output capacitor $C_{out}$ can be coupled in parallel between rectifier circuit 301 and load circuit 302.

In this particular example, controllable switches $Q_1$ and $Q_2$ may essentially replace the two bottom diodes $D_3$ and $D_4$ found in the example of FIG. 1. Also, controllable switches $Q_1$ and $Q_2$ can be controlled according to AC input $V_{AB}$, in order to achieve the driving control for load circuit 302. For example, the state of the present AC input $V_{AB}$ can be determined according to AC input $V_{AB}$, which can be input to rectifier circuit 301. This can be used to control on (conduction) and off (shutdown) of controllable switches $Q_1$ and $Q_2$ according to the corresponding determined state. If the present AC input $V_{AB}$ is in a "first state" (e.g., the AC input $V_{AB}$ is in the positive half cycle and is gradually increasing, or AC input $V_{AB}$ is in the positive half cycle and is gradually decreasing but remaining greater than or equal to a predetermined threshold value), controllable switch $Q_1$ can be turned off, and controllable switch $Q_2$ can be turned on. In this case, the first rectifier circuit including diode $D_1$ and controllable switch $Q_2$ in rectifier circuit 301 can conduct, and AC input $V_{AB}$ may supply power to load circuit 302 and output capacitor $C_{out}$ via the first rectifier circuit.

In this particular example, the threshold value can be set to a voltage value of about 0V, such as exactly or slightly greater than 0V. When present AC input $V_{AB}$ is in a "second state" (e.g., AC input $V_{AB}$ is in the positive half cycle and is gradually decreasing to be less than the threshold value), controllable switch $Q_1$ can be turned on, and controllable switch $Q_2$ may remain on. In this case, the first and second rectifier circuits may not conduct, and controllable switches $Q_1$ and $Q_2$ can form a loop at the input terminal, while output capacitor $C_{out}$ and load circuit 302 can form another loop at the output terminal, and output capacitor $C_{out}$ can discharge to supply power for load circuit 302.

If the AC input $V_{AB}$ is in a "third state" (e.g., AC input $V_{AB}$ is in the negative half cycle and its absolute value is gradually increasing, or AC input $V_{AB}$ is in the negative half cycle and its absolute value is gradually decreasing but still greater than or equal to the threshold value), controllable switch $Q_1$ can be turned on, and controllable switch $Q_2$ can be turned off. In this case, the second rectifier circuit including diode $D_2$ and controllable switch $Q_1$ can conduct, and AC input $V_{AB}$ may supply power to load circuit 302 and output capacitor $C_{out}$ via the second rectifier circuit.

When AC input $V_{AB}$ is in the "fourth state" (e.g., AC input $V_{AB}$ is in the negative half cycle and is gradually decreasing to be less than the threshold value), controllable switches $Q_1$ and $Q_2$ can be turned on. In this case, the first and second rectifier circuit may not conduct, and controllable switches $Q_1$ and $Q_2$ can form a loop at the input terminal, output capacitor $C_{out}$ and load circuit 302 can form another loop at the output terminal, and output capacitor $C_{out}$ can discharge to supply power for load circuit 302.

Figure 4:
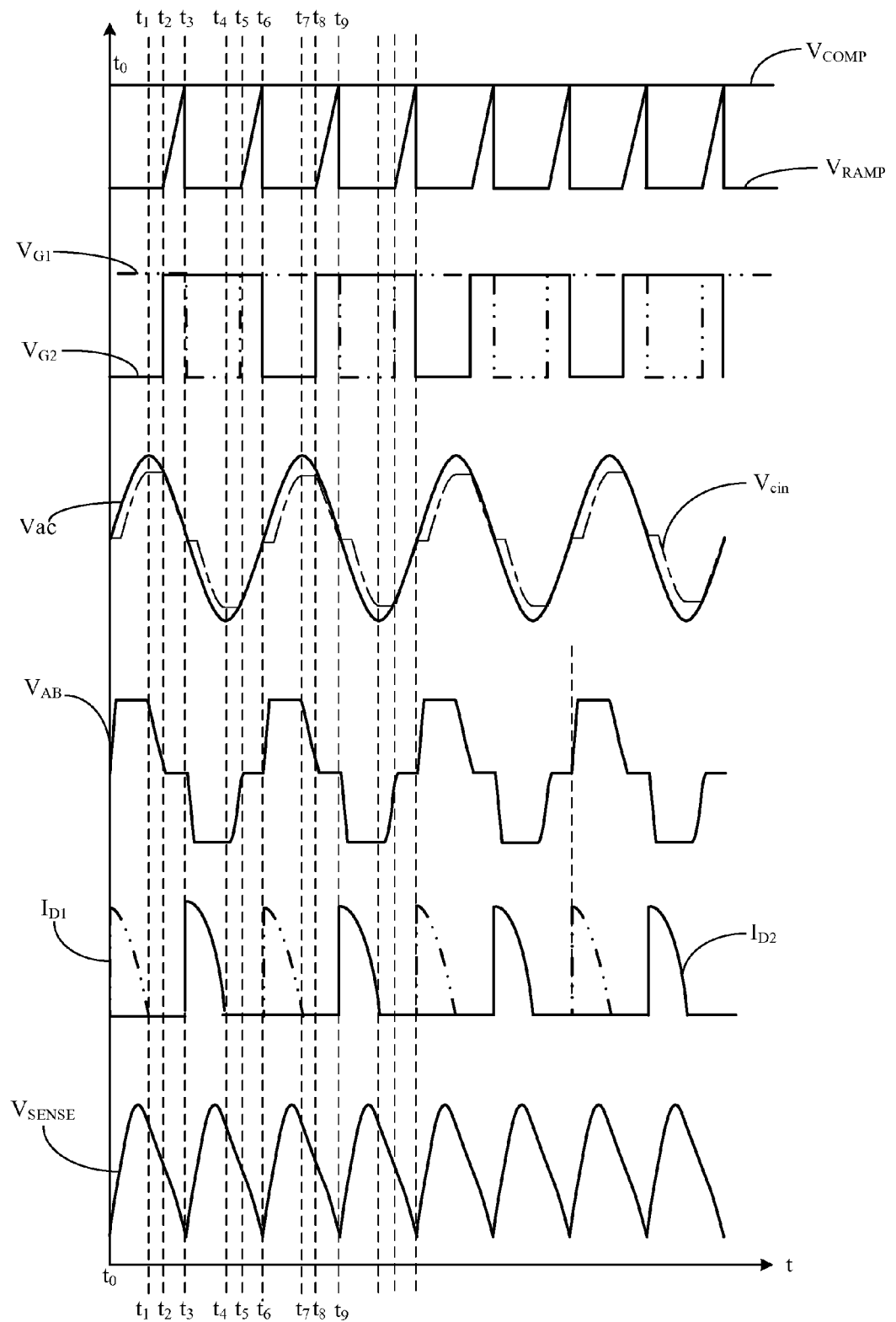
FIG. 4 is a waveform diagram showing example operation of a load driving circuit, in accordance with embodiments of the present invention.

Referring now to FIG. 4, shown is a waveform diagram showing example operation of a load driving circuit, in accordance with embodiments of the present invention. In viewing FIGS. 3 and 4 in combination, the AC input for rectifier circuit 301 can be represented as $V_{AB}$, the threshold value can be represented as $V_{th1}$, a signal for controlling controllable switch $Q_1$ can be represented as $V_{G1}$ (e.g., when $V_{G1}$ is high, controllable switch $Q_1$ can be on), a signal for controlling controllable switch $Q_2$ can be represented as $V_{G2}$ (e.g., when $V_{G2}$ is high, controllable switch $Q_2$ can be on). Also, the external AC input signal can be represented as $V_{ac}$, and $V_{AB}$ can be an AC input signal for rectifier circuit 301. $V_{cin}$ can be a voltage signal for input capacitor $C_{in}$, $I_{d1}$ and $I_{d2}$ may be current signals for the first and second rectifier circuits, respectively, and $V_{SENSE}$ can represent a voltage signal of sense resistor $R_{SENSE}$.

Figure 5:
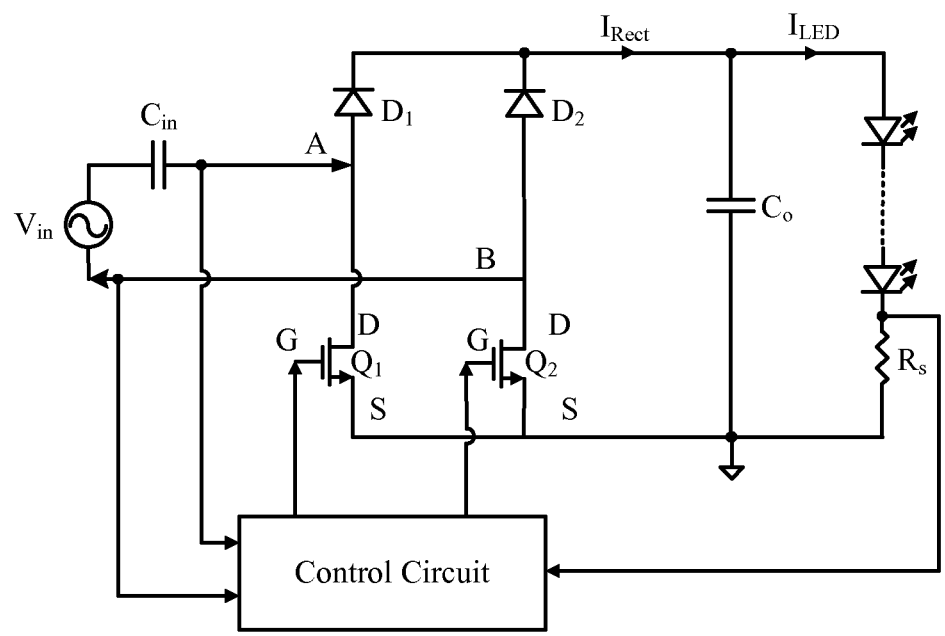
FIG. 5 is an example circuit loop diagram showing the example load driving circuit in the first state, in accordance with embodiments of the present invention.

When $V_{AB}$ turns from a negative half cycle to a positive half cycle, from the rising stage $t_0$-$t_1$ of voltage $V_{AB}$ until the AC input $V_{AB}$ decreases to predetermined threshold value $V_{th1}$ after $V_{AB}$ reaches a peak ($t_1$-$t_2$), (i.e., the duration $t_0$-$t_2$ in the waveform diagram), the circuit can be in the first state. Here, control signal $V_{G1}$ can be low and control signal $V_{G2}$ can be high such that controllable switch $Q_1$ is off and controllable switch $Q_2$ is on. This example circuit loop is shown in FIG. 5.

Figure 6:
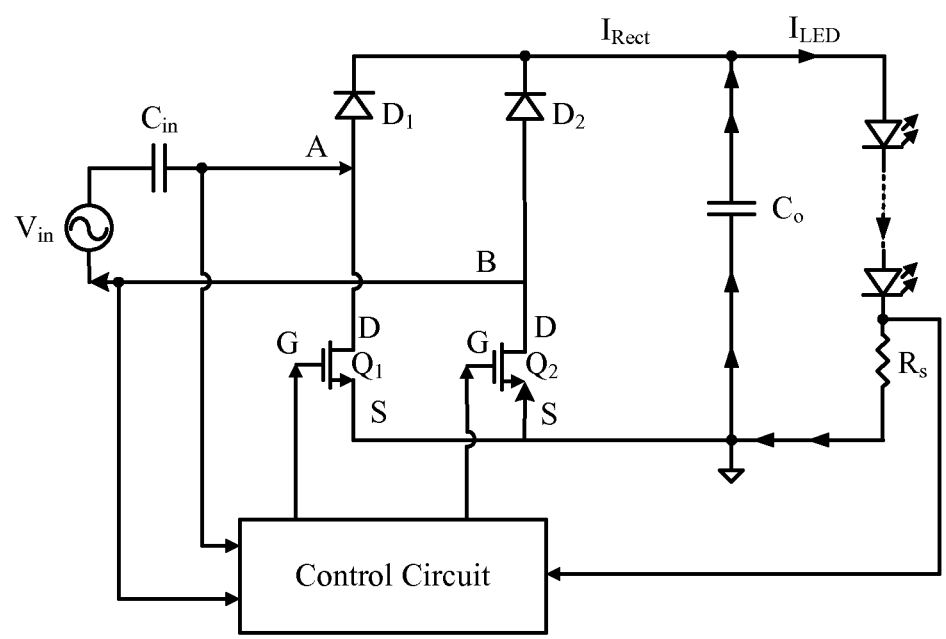
FIG. 6 is an example circuit loop diagram showing the example load driving circuit in the second state, in accordance with embodiments of the present invention.
Figure 7:
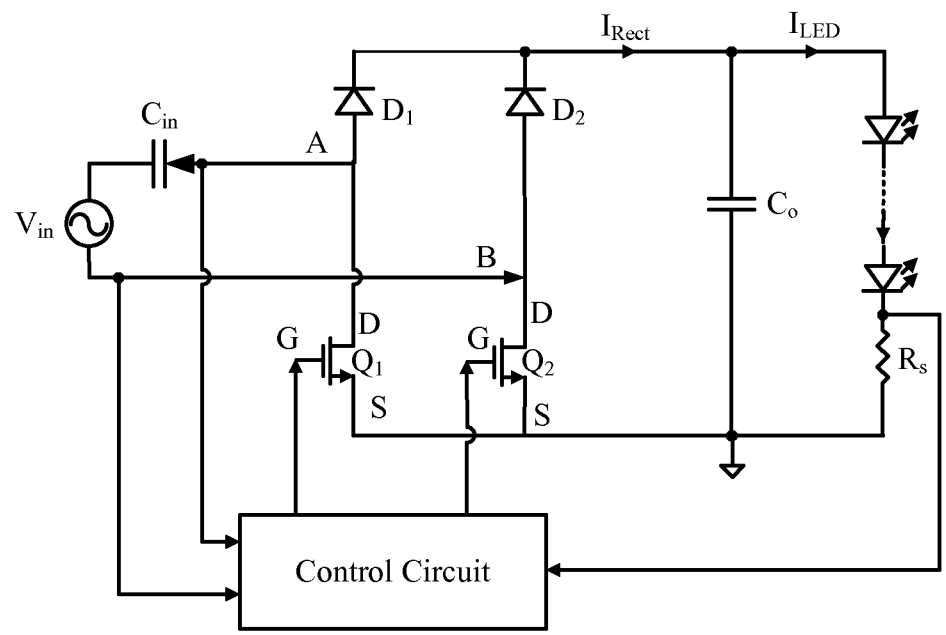
FIG. 7 is an example circuit loop diagram showing the example load driving circuit in the third state, in accordance with embodiments of the present invention.

When $V_{AB}$ is decreasing during the positive half cycle, and in the range of $0<V_{AB}<V_{th1}$, (i.e., period $t_2$-$t_3$ in FIG. 4), the circuit can be in the second state, and control signal $V_{G1}$ and $V_{G2}$ can be high. This example circuit loop is shown in FIG. 6. When $V_{AB}$ turns from positive half cycle to negative half cycle, from the rising stage $t_3$-$t_4$ of the absolute voltage |VAB| to the moment when |VAB| decreases to |VAB|=Vth after |VAB| reaches the peak ($t_4$-$t_5$), (i.e., the duration $t_3$-$t_5$), the circuit can be in the third state. Here, control signal $V_{G1}$ can be high and control signal $V_{G2}$ can be low. This example circuit loop is shown in FIG. 7.

Figure 8:
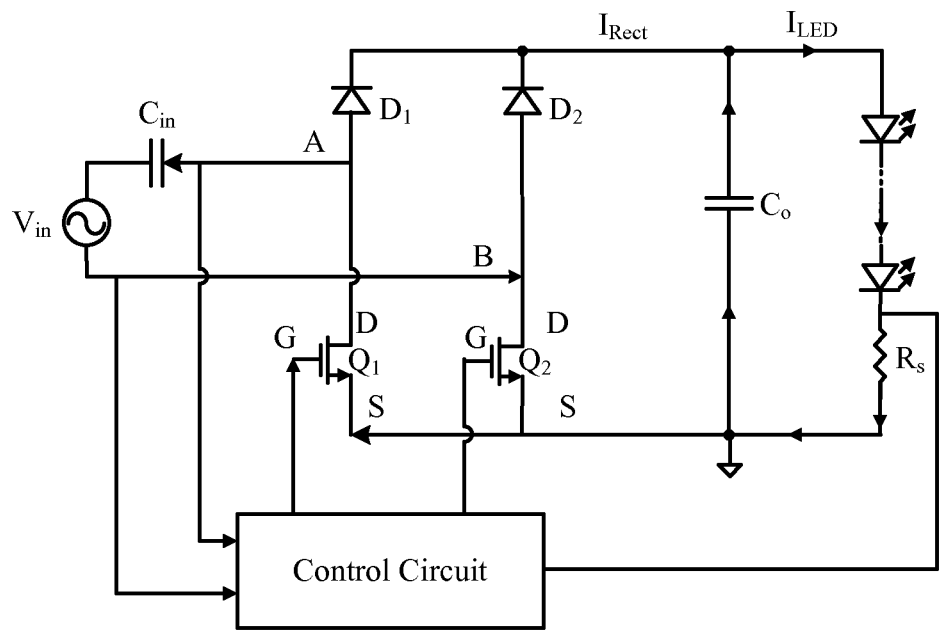
FIG. 8 is an example circuit loop diagram showing the example load driving circuit in the fourth state, in accordance with embodiments of the present invention.

When $V_{AB}$ is in the negative half cycle and |VAB| is decreasing, i.e., 0<|VAB|<Vth, stage $t_5$-$t_6$, the circuit can be in the fourth state, and control signals $V_{G1}$ and $V_{G2}$ may be high. This example circuit loop is shown in FIG. 8. As both of the first and second rectifier circuits of rectifier circuit 301 are coupled to load circuit 302 via switches (e.g., controllable switches $Q_1$ and $Q_2$), to drive load circuit 302 during the entire period of AC input $V_{AB}$, at least one of controllable switches $Q_1$ and $Q_2$ can be turned on. This can ensure that the input and output are commonly grounded to avoid potential floating at the input and output, which could otherwise result in low system stability and/or reliability.

In addition, during the load driving control process, output voltage $V_{out}$ across output capacitor $C_{out}$ can also be monitored in real-time, and may be utilized to determine if the present load circuit is in a short-circuit state. For example, the short-circuit state can be determined according to a comparison result of output voltage $V_{out}$ and a voltage lower limit, and if output voltage $V_{out}$ is less than the voltage limit, the load circuit can be determined to be in the short-circuit state. In response to the load circuit being detected as in the short-circuit state, controllable switches $Q_1$ and $Q_2$ can be turned off to stop operation of the rectifier circuit.

During the load driving control process, output voltage $V_{out}$ across output capacitor $C_{out}$ can be monitored in real-time, and can be used determine if the load circuit is in an open-circuit state. For example, the open-circuit state can be determined according to a comparison result of output voltage $V_{out}$ and a voltage upper limit, and if output voltage $V_{out}$ is greater than the voltage upper limit, the load circuit can be determined to be in the open-circuit state. In response to the load circuit being detected as in such an open-circuit state, controllable switches $Q_1$ and $Q_2$ can be turned off to stop the operation of the rectifier circuit, and to reduce the losses.

Further, during the load driving control process, AC input $V_{AB}$ input to the rectifier circuit can also be monitored in real-time, and can be used determine if the AC input $V_{AB}$ input to the rectifier circuit is in an overvoltage state. For example, the overvoltage state can be determined according to a comparison result of an absolute value of AC input $V_{AB}$ and a voltage upper limit, and if the absolute value of AC input $V_{AB}$ is greater than the input voltage upper limit, the overvoltage state can be determined. In response to the overvoltage state being determined, controllable switches $Q_1$ and $Q_2$ can be turned off and in order to interrupt operation of the rectifier circuit, and to avoid losses on the electronic components.

Figure 9:
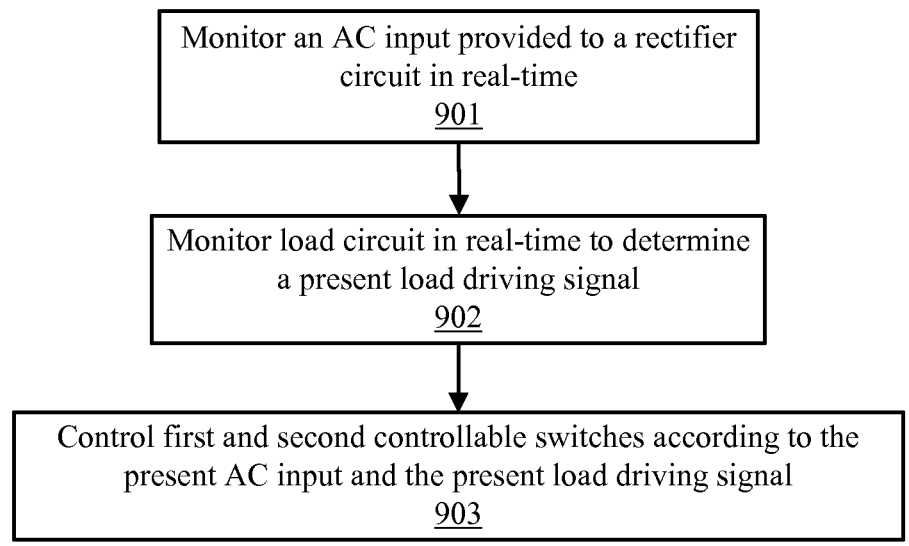
FIG. 9 is a flow diagram of a second example load driving method, in accordance with embodiments of the present invention.

Referring now to FIG. 9, shown is a flow diagram of a second example load driving method, in accordance with embodiments of the present invention. At 901, the AC input provided to the rectifier circuit can be monitored (e.g., via AC input $V_{AB}$) in real-time. At 902, the load circuit can be monitored in real-time to determine the present load driving signal. For example, a present load driving feedback voltage signal $V_{SENSE}$ can be obtained by sampling a voltage at sense resistor $R_{SENSE}$, where a corresponding expected driving signal can be the voltage lower limit. Alternatively, the current of sense resistor $R_{SENSE}$ can be detected and utilized as the present load driving signal, where the corresponding expected driving signal is a current lower limit. Load driving feedback circuit 306 in FIG. 3 shows one example implementation.

At 903, the controllable switches can be controlled according to the present AC input and the present load driving signal. In this example, the present load driving signal can be configured as a control factor for driving control, so as to achieve effective control for load circuit 302. When AC input $V_{AB}$ is in the first state, the control can be the same as above, and when present AC input $V_{AB}$ is in the second state, interrupt control can occur based on the present load driving signal. Once the present load driving signal is less than the expected driving signal, controllable switches $Q_1$ and $Q_2$ can be changed to the subsequent state until entering the third state, where controllable switch $Q_1$ is off, and controllable switch $Q_2$ is on. When present AC input $V_{AB}$ is in the third state, the control can be the same as above, and when present AC input $V_{AB}$ is in the fourth state, interrupt control can occur based on the present load driving signal. Once the present load driving signal is less than the expected driving signal, controllable switches $Q_1$ and $Q_2$ can be changed to the subsequent state until entering the first state, where controllable switch $Q_1$ is on, and controllable switch $Q_2$ is off.

As shown in FIG. 4, during stage $t_2$-$t_3$, once the present load driving signal is less than expected drive signal, controllable switches $Q_1$ and $Q_2$ can be changed to the subsequent state, where controllable switch $Q_1$ can be off, and controllable switch $Q_2$ can be on, per the circuit loop diagram of FIG. 5. Interrupt control for controllable switches $Q_1$ and $Q_2$ can be achieved by monitoring load circuit 302, and the external current can be added in when the discharging of output capacitor $C_{out}$ such that the load driving electric current is sufficient, and the load operating stability can be improved.

During stage $t_5$-$t_6$, when the present load driving signal is lower than the expected driving signal, controllable switches $Q_1$ and $Q_2$ can be changed to the subsequent state. Here, $V_{G1}$ can be high, and $V_{G2}$ can be low, in order maintain controllable switch $Q_1$ on and to turn off controllable switch $Q_2$, per the circuit loop diagram of FIG. 7. Also, interrupt control for controllable switches $Q_1$ and $Q_2$ can be achieved by monitoring load circuit 302, and external current can be added in cases when the discharging of output capacitor $C_{out}$ as shown in FIG. 7 may be insufficient as to the present current. In this way, load driving current can be sufficient, and load operating stability can be improved.

Figure 10:
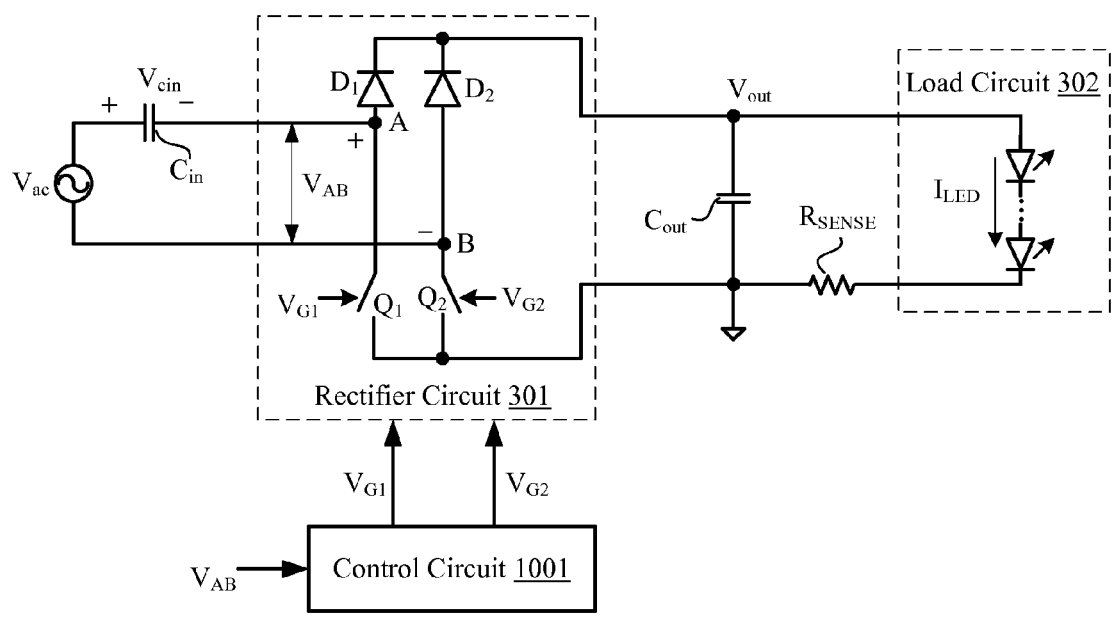
FIG. 10 is a schematic diagram of an example load driving circuit, in accordance with embodiments of the present invention.

Referring now to FIG. 10, shown is a schematic diagram of an example load driving circuit, in accordance with embodiments of the present invention. The driving circuit can include input capacitor $C_{in}$, rectifier circuit 301, control circuit 1001, and output capacitor $C_{out}$, with many of the same structures as FIG. 3. One terminal of input capacitor $C_{in}$ can connect to the positive terminal of AC power supply $V_{ac}$, the other terminal can connect to input terminal A of rectifier circuit 301, while the other terminal at node B can connect to the negative terminal of AC power supply $V_{ac}$.

Rectifier circuit 301 can include first and second rectifier circuits, where the first rectifier circuit can include diode $D_1$ and controllable switch $Q_2$. The second rectifier circuit can include diode $D_2$ and controllable switch $Q_1$. An anode of diode $D_1$ can connect to the positive terminal of the AC input at node A, and the cathode thereof can connect to a first terminal of output capacitor $C_{out}$. The first terminal of controllable switch $Q_2$ can connect to the negative terminal of AC input at node B, and the second terminal can connect to the second terminal of output capacitor $C_{out}$. The anode of diode $D_2$ can connect to the negative terminal of AC input at node B, and the cathode thereof can connect to the first terminal of output capacitor $C_{out}$. The first terminal of controllable switch $Q_1$ can connect to the positive terminal of the AC input at node A, and the second terminal can connect to the second terminal of output capacitor $C_{out}$.

Output capacitor $C_{out}$ can be coupled in parallel between rectifier circuit 301 and load circuit 302. The input terminal of control circuit 1001 can be coupled with the AC input terminal of rectifier circuit 301, and the output terminal can be coupled to controllable switches $Q_1$ and $Q_2$. Control circuit 1001 can control conduction (on) and shutdown (off) states of controllable switches $Q_1$ and $Q_2$ according to AC input $V_{AB}$ of rectifier circuit 301. Because both rectifier circuits of rectifier circuit 301 can be coupled to load circuit 302 via switches (e.g., controllable switches $Q_1$ and $Q_2$), during the full period of AC input $V_{AB}$, at least one of controllable switches $Q_1$ and $Q_2$ can be turned on. This can ensure that the input and output are commonly grounded to avoid floating, which could otherwise result in low system stability and/or reliability.

With reference also to FIG. 3, control circuit 1001 can include AC input judging circuit 303, threshold value control circuit 304, and logic circuit 305. AC input judging circuit 303 can be coupled to the AC input terminal of rectifier circuit 301, and may be used for determining the state of the AC input $V_{AB}$. As discussed above, the states can include positive half cycle, negative half cycle, rising stage, and decreasing stage considerations, and the state determination or "judging" result can be provided to logic circuit 305.

Figure 11:
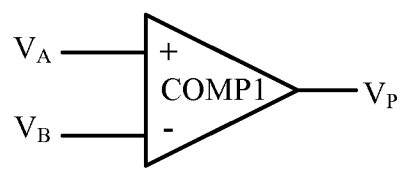
FIG. 11 is a schematic block diagram of an example AC input judging circuit, in accordance with embodiments of the present invention.

Referring now to FIG. 11, shown is a schematic block diagram of an example AC input judging circuit, in accordance with embodiments of the present invention. For example, AC input judging circuit 303 can include comparator COMP1 coupled to receive the AC input rectifier circuit 301 at nodes A and B. Comparator COMP1 can compare the input voltage levels at input terminals A and B, and output comparison signal $V_P$ to logic circuit 305. Thus, logic circuit 305 can determine the state of AC input $V_{AB}$ according to comparison signal $V_P$, such as whether the AC input is in the positive half cycle or negative half cycle.

For example, the non-inverting input terminal of comparator COMP1 can receive voltage $V_A$, and the inverting input terminal can receive voltage $V_B$. When voltage $V_A$ is greater than voltage $V_B$, output signal $V_P$ can be high. When $V_{AB}$ is no less than zero, the AC input appears in the positive half cycle. When $V_{AB}$ is less than zero, the AC input appears in the negative half cycle. Threshold value control circuit 304 can connect to the AC input terminal of rectifier circuit 301, and may generate a comparison flip-flop signal indicating if the absolute value of the AC input is less than the threshold value $V_{TH}$ according to the comparison result of the absolute value of AC input $V_{AB}$ and the predetermined threshold value.

Figure 12:
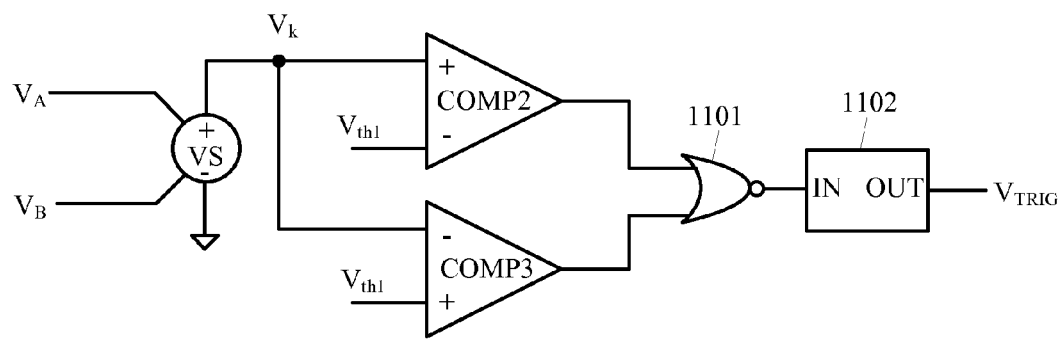
FIG. 12 is a schematic block diagram of an example threshold value control circuit, in accordance with embodiments of the present invention.

Referring now to FIG. 12, shown is a schematic block diagram of an example threshold value control circuit, in accordance with embodiments of the present invention. For example, threshold value control circuit 304 can include voltage-controlled voltage source VS, comparators COMP2 and COMP3, NOR-gate 1101, and single pulse generating circuit 1102. Two input terminals of voltage-controlled voltage source VS can be coupled to two corresponding AC input terminals of rectifier circuit 301 for receiving voltages $V_A$ and $V_B$, and may output voltage-controlled voltage $V_k$ that represents voltages $V_A$ and $V_B$.

The positive input terminal of comparator COMP2 can connect to the output terminal of voltage-controlled voltage source VS, and the inverting input terminal can receive threshold value $V_{th1}$. Comparator COMP2 can compare voltage-controlled voltage $V_k$ against threshold value $V_{th1}$, and may output a threshold value comparison result. The positive input terminal of comparator COMP3 can receive threshold value $V_{th1}$, and the inverting input terminal can connect to an output of voltage-controlled voltage source VS. Comparator COMP2 can compare voltage-controlled voltage $V_k$ against threshold value $V_{th1}$, and may output a second threshold value comparison result.

Two input terminals of NOR-gate 1101 can connect to comparators COMP2 and COMP3, and NOR-gate 1101 can outputs a logic operation on the threshold value comparison result and the second threshold value comparison result. The circuit formed by voltage-controlled voltage source VS, comparators COMP2 and COMP3, and NOR-gate 1101 can be configured as operation circuit 1103. Input terminal IN of signal pulse generating circuit 1102 can connect to the output terminal of NOR-gate 1101, and may be used to output a comparison trigger signal $V_{TRIG}$ at output terminal OUT according to the logic signal.

In one example, the threshold value can be a voltage level of about +2V. Voltage-controlled voltage $V_k$ of voltage-controlled voltage source VS can be compared to the positive voltage threshold value by comparator COMP2. When voltage-controlled voltage $V_k$ is less than 2V, the output of comparator COMP2 can be low. In addition, voltage-controlled voltage $V_k$ can be compared against the negative voltage threshold value by comparator COMP3 (e.g., about −2V), and when voltage-controlled voltage $V_k$ is greater than −2V, the output of comparator COMP3 can be low. NOR circuit 1101 can receive the output signals of comparators COMP2 and COMP3, and when these signals are low, NOR-gate 1101 can output a high level. Input terminal IN of single pulse generating circuit 1102 can receive an output of NOR circuit 1101, and when the output signal of NOR-gate 1101 is high, $V_{TRIG}$ can go high.

Logic circuit 305 may have an input terminal coupled to AC input judging circuit 303 and threshold value control circuit 304, and may output control signals to controllable switches $Q_1$ and $Q_2$ according to AC input $V_{AB}$ input to rectifier circuit 301. For example, logic circuit 305 can include "trigger" or flip-flop 3051 and logic sub-circuit 3052. Set terminal S of flip-flop 3051 can connect to the output terminal of threshold value control circuit 304. Flip-flop 3051 can output a trigger signal to logic sub-circuit 3052 at output terminal Q according to the comparison trigger signal received at set terminal S. The first input terminal of logic sub-circuit 3052 can connect to the output terminal of AC input judging circuit 303, and the second input terminal can connect to output terminal Q of flip-flop 3051. Output signals at two output terminals can be control signals $V_{G1}$ and $V_{G2}$ for controlling controllable switches $Q_1$ and $Q_2$.

As in FIG. 3, control circuit 1001 can include load driving feedback circuit 306 and load feedback control circuit 307. Load driving feedback circuit 306 can be coupled to load circuit 302 for monitoring load circuit 302 in real-time, and may also set the voltage or current parameter of the driving signal of load circuit 302 as the present load driving signal. Load driving feedback circuit 306 can include sense resistor $R_{SENSE}$ series-coupled to load circuit 302, and a voltage sense circuit coupled in parallel to sense resistor $R_{SENSE}$ for sampling voltage $V_{SENSE}$ of sense resistor $R_{SENSE}$. As the impedance of sense resistor $R_{SENSE}$ can be essentially constant, voltage $V_{SENSE}$ of sense resistor $R_{SENSE}$ can be in direct proportion to the current flowing through sense resistor $R_{SENSE}$ (e.g., current $I_{LED}$ flowing through load circuit 302). This, by using voltage $V_{SENSE}$ to represent the load current, current $I_{LED}$ flowing through load circuit 302 can be controlled by monitoring voltage $V_{SENSE}$.

Load feedback control circuit 307 can be coupled to load driving feedback circuit 306 and logic circuit 305. Logic circuit 305 can control controllable switches $Q_1$ and $Q_2$ according to the state of the load driving signal. When present AC input $V_{AB}$ is in the second state, both of controllable switches $Q_1$ and $Q_2$ are on, and output capacitor $C_{out}$ can supply power to the load. When the current of present load circuit 302 is less than the expected driving signal, controllable switches $Q_1$ and $Q_2$ may both be on until entering the third state.

When present AC input $V_{AB}$ is in the fourth state, controllable switches $Q_1$ and $Q_2$ can be turned on, and output capacitor $C_{out}$ can supply power to the load. When the current of present load circuit 302 is less than the expected driving signal, controllable switch $Q_2$ can be turned off, and controllable switch $Q_1$ may remain on. By controlling controllable switches $Q_1$ and $Q_2$ according to the load driving signal, the external current can be added in to make sure that the load driving signal can satisfy current requirements when the present current requirement cannot be satisfied via the discharging of output capacitor $C_{out}$, to further improve the load operation stability.

Logic circuit 305 can include flip-flop 3051 and logic sub-circuit 3052. The inverting output terminal of flip-flop 3051 can be coupled to load feedback control circuit 307, and may be used to control operation of load feedback control circuit 307. The output terminal of load feedback control circuit 307 can be coupled to reset terminal R of flip-flop 3051, to further control controllable switches $Q_1$ and $Q_2$ according to the load driving signal. In combination with present AC input $V_{AB}$ and the load driving signal, control of controllable switches $Q_1$ and $Q_2$ can be: when the present load driving signal is less than the expected driving signal, load feedback control circuit 307 may output an interrupt control signal.

When AC input $V_{AB}$ is in the first state, controllable switch $Q_1$ can be turned off, and controllable switch $Q_2$ can be turned on. In this case, AC input $V_{AB}$ can supply power to load circuit 302 and output capacitor $C_{out}$ via the first rectifier circuit that includes diode $D_1$ and controllable switch $Q_2$ until entering the second state. When AC input $V_{AB}$ is in the second state, controllable switches $Q_1$ and $Q_2$ can be turned on, and output capacitor $C_{out}$ can supply power to load circuit 302 until receiving an interrupt control signal from load feedback control circuit 307. When the interrupt control signal is activated, control signal $V_{G1}$ may be used to turn on controllable switch $Q_1$ according to the interrupt control signal, and to maintain control switch $Q_1$ on. Also, control signal $V_{G2}$ can be used to turn off controllable switch $Q_2$ until the circuit enters to the third state.

When AC input $V_{AB}$ is in the fourth state, controllable switches $Q_1$ and $Q_2$ can be turned on, and output capacitor $C_{out}$ can supply power to load circuit 302 until receiving the interrupt control signal from load feedback control circuit 307. When the interrupt control signal is activated control signal $V_{G2}$ can be used to turn on controllable switch $Q_2$ according to the received interrupt control signal, and to maintain control switch $Q_2$ on. Also, control signal $V_{G1}$ can be used to turn off controllable switch $Q_1$, until the circuit enters the first state.

Load driving feedback circuit 307 can include ramp generating circuit 3071, compensation signal generating circuit 3072, and comparator COMP4. For example, ramp generating circuit 3071 can connect to the inverting output terminal of flip-flop 3051, and when AC input $V_{AB}$ is in the second state or the fourth state, the output at Q of flip-flop 3051 can be high. The inverting output terminal of flip-flop can be low, and controllable switch $Q_0$ of ramp generating circuit 3071 can be turned off. In this case, external DC current $I_0$ may charge charging capacitor $C_{CHG}$, and charging capacitor $C_{CHG}$ may provide ramp voltage $V_{RAMP}$ to comparator COMP4.

Compensation signal generating circuit 3072 with an input terminal coupled to the output terminal of load driving feedback circuit 306, can generate compensation signal $V_{COMP}$ according to an error between the present load driving feedback signal and expected voltage $V_{REF}$. For example, expected voltage $V_{REF}$ can be set according to practical requirements of load circuit 302 to meet the expected load driving current requirements, so as to ensure normal/steady operation of load circuit 302.

Comparator COMP4 may be coupled to ramp generating circuit 3071 and compensation signal generating circuit 3072, and may have an output coupled to reset terminal R of flip-flop 3051. COMP4 can compare ramp voltage $V_{RAMP}$ and compensation voltage $V_{COMP}$. When ramp voltage $V_{RAMP}$ rises to a level of compensation voltage $V_{COMP}$, interrupt control signal can be high at reset terminal R of flip-flop 3051. Thus, flip-flop 3051 can be reset, and the output signal at Q may go low, and controllable switch $Q_0$ can turn on. In this case, ramp voltage $V_{RAMP}$ may rapidly decrease to zero, so as to achieve control for the driving circuit according to a load driving signal when the circuit is in the second or fourth state.

Figure 13:
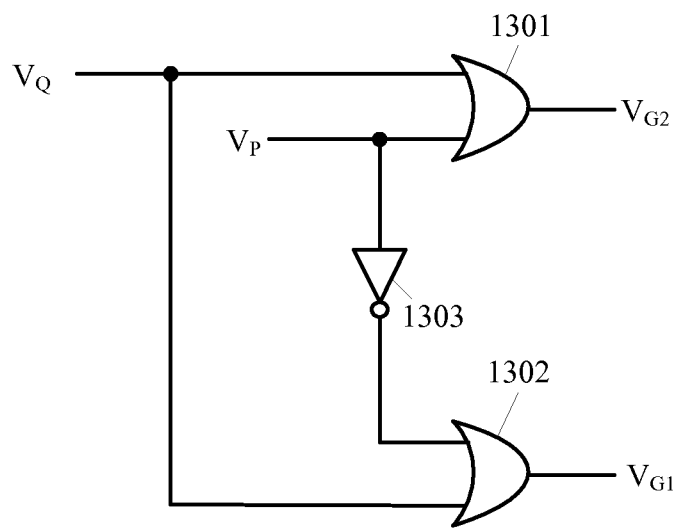
FIG. 13 is a schematic block diagram of an example logic sub-circuit, in accordance with embodiments of the present invention.

Referring now to FIG. 13, shown is a schematic block diagram of an example logic sub-circuit, in accordance with embodiments of the present invention. In this example, logic sub-circuit 3052 can include OR-gate 1301, inverter 1303, and OR-gate 1302. OR-gate 1301 can connect to an output terminal of flip-flop 3051 to receive signal $V_Q$, a second input terminal can be coupled to an output of AC input judging circuit 303 to receive signal $V_P$, and the output of OR-gate 1301 can be control signal $V_{G2}$. When signal $V_P$ is high, or when signal $V_Q$ is high, control signal $V_{G2}$ can be high, and controllable switch $Q_2$ may be turned on.

Inverter 1303 may have an input terminal coupled to an output of AC input judging circuit 303 to receive signal $V_P$, and an output terminal coupled to a first input terminal of OR-gate 1302. The second input terminal of OR-gate 1302 can connect to output terminal Q of flip-flop 3051 to receive signal $V_Q$, and the output of OR-gate 1302 can be control signal $V_{G1}$. When signal $V_P$ is low, or when signal $V_Q$ is high, control signal $V_{G1}$ can be high, and controllable switch $Q_1$ can be turned on.

Figure 14:
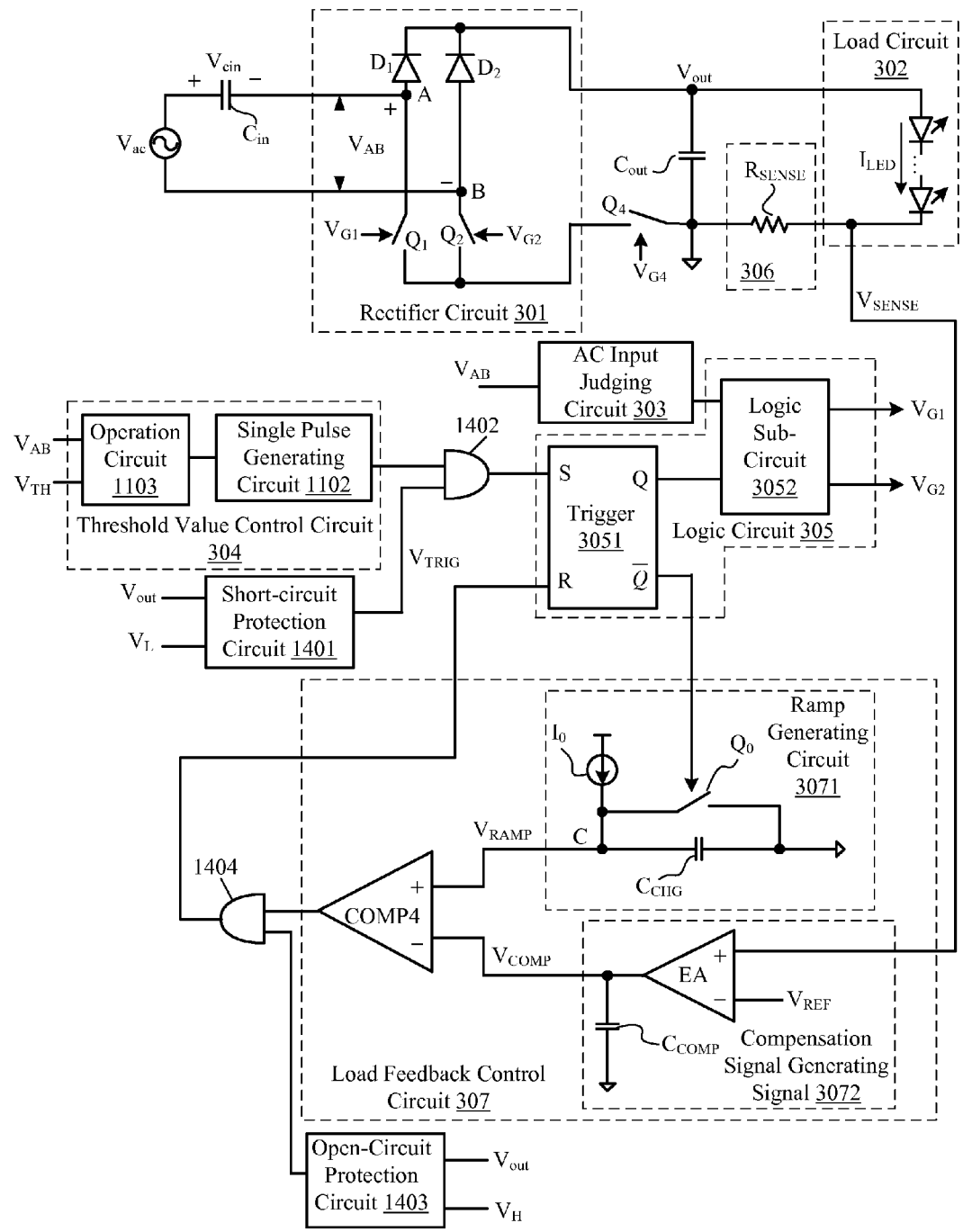
FIG. 14 is a schematic block diagram of an example load driving circuit, in accordance with embodiments of the present invention.

Referring now to FIG. 14, shown is a schematic block diagram of an example load driving circuit, in accordance with embodiments of the present invention. In this particular example, short-circuit protection circuit 1401 and AND-gate 1402 can be included. AND-gate 1402 may have a first input terminal coupled to an output of short-circuit protection circuit 1401, a second input terminal coupled to an output of threshold value control circuit 304, and an output terminal coupled to the set terminal of flip-flop 3051. The input terminal of short-circuit protection circuit 1401 can receive output voltage $V_{out}$ of output capacitor $C_{out}$, and may be used to compare output voltage $V_{out}$ against the predetermined voltage lower limit $V_L$. For example, if output voltage $V_{out}$ is lower than predetermined voltage lower limit $V_L$, the short-circuit protection signal can be activated at an input to AND-gate 1402. The predetermined voltage lower limit $V_L$ can be set according to practical requirements of load circuit 302, to make sure that the output can be cut off when load circuit 302 is shorted, for short-circuit protection control.

When output voltage $V_{out}$ is less than voltage threshold value $V_L$, load circuit 302 can be determined as in the short-circuit state, and short-circuit protection circuit 1401 can output a low level to AND-gate 1402. With short-circuit protection circuit 1401 and AND-gate 1402, the signal at set terminal S of flip-flop 3051 may be low, and flip-flop 3051 may not be set even though the output signal of threshold value control circuit 304 is high, and the output signal at Q can be low. In combination with the operation waveform diagram shown in FIG. 4, controllable switch $Q_1$ may not be on at time $t_2$. In addition, control circuit 1001 can also include open-circuit protection circuit 1403 and AND-gate 1404. AND-gate 1404 may have a first input terminal coupled to an output of open-circuit protection circuit 1403, and a second input terminal coupled to the output of load feedback control circuit 307 to receive the interrupt control signal output, and an output terminal coupled to reset terminal R of flip-flop 3051.

Open-circuit protection circuit 1403 can receive output voltage $V_{out}$ of output capacitor $C_{out}$, and can compare output voltage $V_{out}$ against output voltage upper limit $V_H$. If output voltage $V_{out}$ is higher than output voltage upper limit $V_H$, it can be determined that load circuit 302 is in an open-circuit state. The output signal of open-circuit protection circuit 1403 can go low at an input to AND-gate 1404. The input signal at reset terminal R of flip-flop 3051 can remain low, and flip-flop 3051 may not be reset even though the interrupt control signal output by load feedback control circuit 307 is high, and the output signal at Q of flip-flop 3051 can be low. In combination with the operation waveform diagram shown in FIG. 4, at time $t_3$, controllable switch $Q_1$ may not be turned off, so as to make sure that energy at the input side is not transferred to output capacitor $C_{out}$, to protect against possible explosion or damage due to the high energy of output capacitor $C_{out}$.

Figure 15:
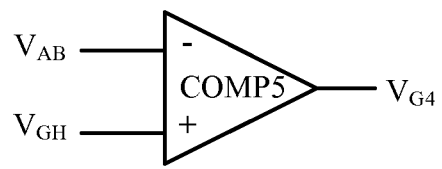
FIG. 15 is a schematic block diagram of an example comparator in an overvoltage protection circuit, in accordance with embodiments of the present invention.

Referring now to FIG. 15, shown is a schematic block diagram of an example comparator in an overvoltage protection circuit, in accordance with embodiments of the present invention. In this example, input overvoltage protection circuit 1405 can include controllable switch $Q_4$ and comparator COMP5. Controllable switch $Q_4$ can connect between an output terminal of rectifier circuit 301 and output capacitor $C_{out}$. In addition, controllable switch $Q_4$ can be coupled at the positive output terminal and/or the negative output terminal.

Comparator COMP5 may have a first input terminal coupled to the AC input terminal of rectifier circuit 301 to receive AC input $V_{AB}$, and a second input terminal receiving the predetermined input voltage upper limit $V_{GH}$. For example, when AC input $V_{AB}$ of rectifier circuit 301 is greater than input voltage upper limit $V_{GH}$, the input voltage can be determined to be in the overvoltage state. In this case, comparator COMP5 may disable control signal $V_{G4}$ to turn off controllable switch $Q_4$. For example, when the input is in the overvoltage state, comparator COMP5 can output a low $V_{G4}$ signal to turn off switch $Q_4$. In this way, possible damage on the load caused by output overvoltage can be avoided to further improve the safety of load circuit 302.

Controllable switches as described herein can include Metal-Oxide-Semiconductor Field-Effect Transistors (MOS-FETs) with body diodes. To further avoid switching losses, when the absolute value of a voltage at input terminal A of rectifier circuit 301 is less than a voltage threshold value, controllable switch $Q_1$ can be turned on. When the absolute value of voltage at node B is less than the voltage threshold value, controllable switch $Q_2$ can be turned on, in order to realize zero-voltage conduction of the switches to reduce switching losses. Of course, other types of transistors or other switches can be utilized as controllable switches in other cases.

Figure 16:
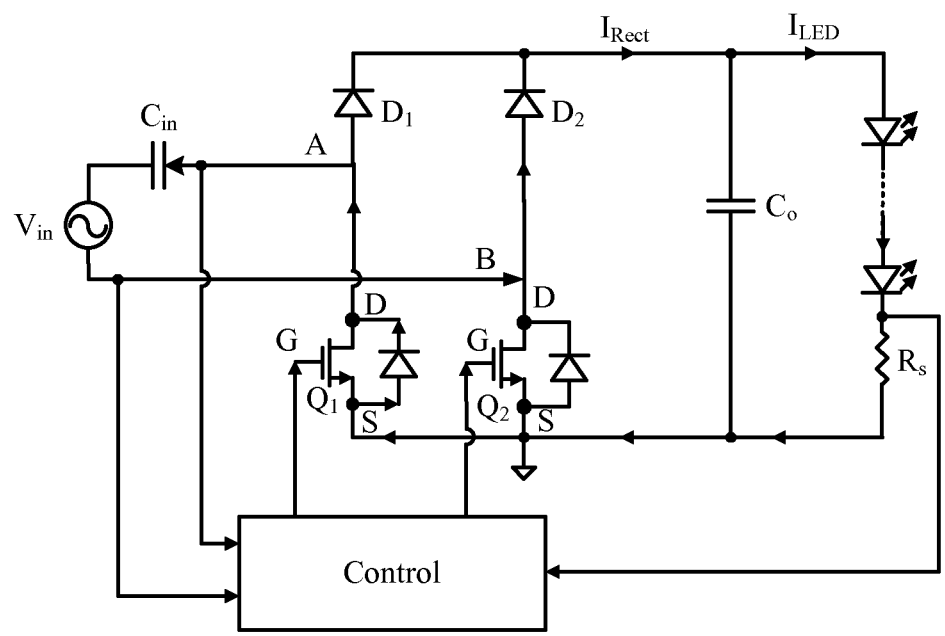
FIG. 16 is an example circuit loop diagram showing an example circuit in the first state, in accordance with embodiments of the present invention.

When a MOSFET with a body diode acts as each of controllable switches $Q_1$ and $Q_2$, at the second state and the fourth state, i.e. $|V_A - V_B| < V_{TH}$, the on/off control of controllable switches $Q_1$ and $Q_2$ can be as described above. However, in the first state, the AC input is in the positive half cycle, and when the absolute value of the voltage at node B is $|V_B| < V_{TH}$, controllable switch $Q_2$ can be turned on to realize zero-voltage conduction of controllable switch $Q_2$ to reduce switching losses. While in the rest time periods, the absolute value $V_B$ of the voltage at node B can be greater than threshold value $V_{TH}$, and the body diode of controllable switch $Q_2$ and diode $D_1$ can form a first rectifier circuit to supply power to load circuit 302 and output capacitor $C_{out}$ coupled in parallel with the load circuit. The circuit loop schematic diagram for this case can be as shown in FIG. 16.

In combination with the operation waveform in FIG. 4, in the first state, during the period from time $t_0$ to time $t_2$, when the voltage at node A is less than a threshold value or close to zero, controllable switch $Q_2$ can be turned on. As the voltage at node A is low enough, it can be approximated as zero-voltage conduction to reduce the switching losses. While in the rest time period, the body diode of controllable switch $Q_2$ can be used to realize a rectifying function.

Figure 17:
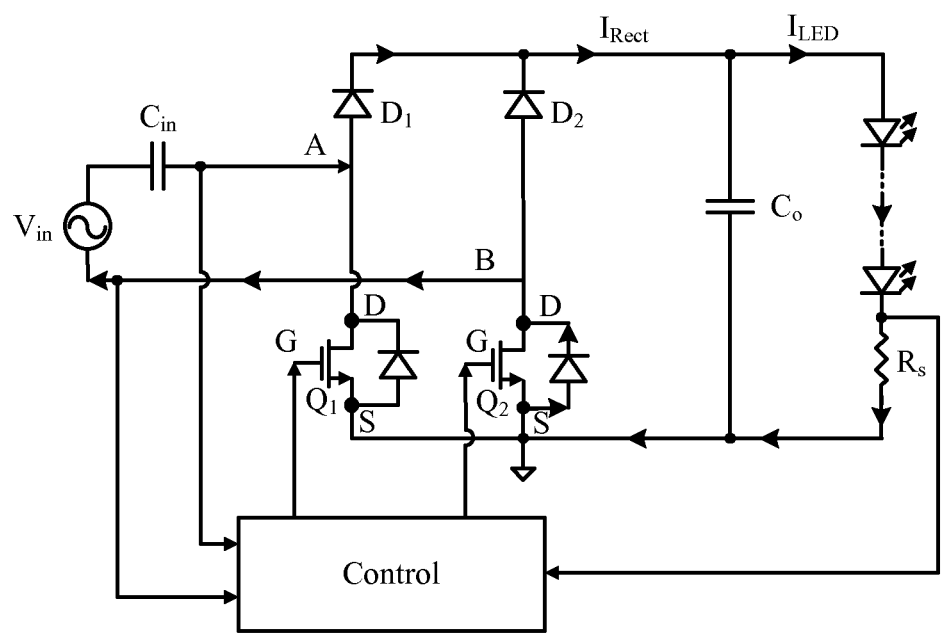
FIG. 17 is a circuit loop diagram showing an example circuit in the third state, in accordance with embodiments of the present invention.

Similarly, in the third state, the AC input can be in the negative half cycle, when the absolute value of the voltage at node A is $|V_A| < V_{TH}$, controllable switch $Q_1$ can be turned on, to realize zero-voltage conduction of controllable switch $Q_1$ to reduce the conduction losses of the switch. While in the rest time periods, the absolute value $V_A$ of the voltage at node A can be greater than threshold value $V_{TH}$, and the body diode of controllable switch $Q_1$ and diode $D_2$ can form a first rectifier circuit to supply power to load circuit 302 and output capacitor $C_{out}$ coupled in parallel with the load circuit. An example circuit loop schematic diagram can be as shown in FIG. 17.

In combination with the operation waveform in FIG. 4, during the period from time $t_3$ to time $t_5$, when the voltage at node A is less than threshold value $V_{TH}$ or close to zero, controllable switch $Q_1$ can be turned on. As the voltage at node A is low enough, it can be approximated as zero-voltage conduction to reduce the switching losses. While in the rest time period, the body diode of controllable switch $Q_1$ can be used to realize a rectifying function. Furthermore, control circuit 1001 can also include another control circuit, such as without AC input judging circuit 303.

Figure 18:
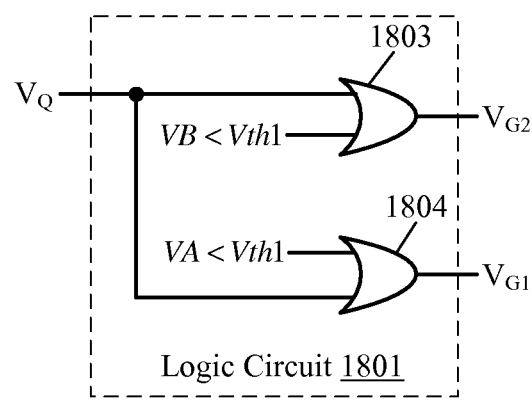
FIG. 18 is a schematic block diagram of an example logic circuit, in accordance with embodiments of the present invention.

Referring now to FIG. 18, shown is a schematic block diagram of an example logic circuit, in accordance with embodiments of the present invention. In this example, logic circuit 1801 can include OR-gates 1803 and 1804, and this may replace the above mentioned logic control circuit 3052. Threshold value control circuit 304 may have an input terminal receiving AC input $V_{AB}$, and can generate a comparison trigger signal according to a comparison result of the absolute value of the AC input against the predetermined threshold value. The comparison trigger signal can indicate whether the absolute value of the AC input is lower than the threshold value.

Flip-flop 3051 may have a set terminal coupled to an output of threshold value control circuit 304 to receive the comparison trigger signal, and an output terminal coupled to a second input terminal of logic circuit 1801 can provide a trigger signal to logic sub-circuit 3052. Flip-flop 3051 can receive an output of load feedback control circuit 307 at the reset terminal, so as to receive the interrupt control signal. Logic circuit 1801 can include OR-gates 1803 and 1804. OR-gate 1803 may have an input terminal to receive signal $V_Q$ at terminal Q of flip-flop 3051, and another input terminal to receive the comparison result of voltage $V_B$ and threshold value $V_{TH}$.

The comparison between voltage $V_B$ and threshold value $V_{TH}$ can be realized by a comparator, or any other suitable circuits. When output signal $V_Q$ is high, or $|V_B|<V_{TH}$, the output of OR-gate 1803 can be high, so controllable switch $Q_2$ can be on. OR-gate 1804 may have an input terminal to receive signal $V_Q$ at terminal Q of flip-flop 3051, and another input terminal to receive the comparison result of voltage $V_A$ and threshold value $V_{TH}$. When output signal $V_Q$ is high, or $|V_A|<V_{TH}$, the output of OR-gate 1804 can be high, and controllable switch $Q_1$ can be on.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of driving a load, the method comprising:
    a) monitoring an AC input to a rectifier circuit in real-time, wherein said rectifier circuit comprises first and second rectifier circuits;
    b) turning off a first controllable switch and turning on a second controllable switch when said AC input is in a first state, wherein said first state comprises said AC input being in a positive half cycle and increasing, or said AC input being in said positive half cycle and decreasing while being at least as high as a predetermined threshold value;
    c) using said AC input to supply power to a load circuit and an output capacitor via said first rectifier circuit when said AC input is in said first state, wherein said first rectifier circuit comprises a first diode and said second controllable switch;
    d) turning on said first and second controllable switches and using said output capacitor to supply power to said load circuit when said AC input is in a second state, wherein said second state comprises said AC input being in positive half cycle and decreasing to less than said threshold value;
    e) turning on said first controllable switch and turning off said second controllable switch when said AC input is in a third state, wherein said third state comprises said AC input being in a negative half cycle and having an absolute value increasing, or said AC input being in said negative half cycle and having said absolute value decreasing and at least as high as said threshold value;
    f) using said AC input to supply power to said load circuit and said output capacitor via said second rectifier circuit when said AC input is in said third state, wherein said second rectifier circuit comprises a second diode and said first controllable switch; and
    g) turning on said first and second controllable switches and using said output capacitor to supply power to said load circuit when said AC input is in a fourth state, wherein said fourth state comprises said AC input being in said negative half cycle and having an absolute value decreasing to be less than said threshold value.

2. The method of claim 1, wherein when said AC input is in said second state, further comprising maintaining said second controllable switch as on, and turning off said first controllable switch, until said AC input enters said third state, in response to a present load driving signal being less than an expected driving signal.

3. The method of claim 2, wherein when said AC input is in the fourth state, further comprising maintaining said first controllable switch as on, and turning off said second controllable switch until said AC input enters said first state, in response to said present load driving signal being less than said expected driving signal.

4. The method of claim 1, wherein said threshold value comprises a voltage of about 0V.

5. The method of claim 1, further comprising:
    a) determining if said load circuit is in a short-circuit state by monitoring an output voltage of said output capacitor; and
    b) turning off said first and second controllable switches if said load circuit is determined to be in said short-circuit state.

6. The method of claim 1, further comprising:
    a) determining if said load circuit is in an open-circuit state by monitoring an output voltage of said output capacitor; and
    b) turning off said first and second controllable switches if said load circuit is determined to be in said open-circuit state.

7. The method of claim 1, further comprising:
    a) determining if said load circuit is in an overvoltage state by monitoring said AC input in real-time; and
    b) turning off a fourth controllable switch if said load circuit is determined to be in said overvoltage state, wherein said fourth controllable switch is coupled between said rectifier circuit and said output capacitor.

8. The method of claim 1, further comprising:
    a) turning on said second controllable switch when said AC input is in said first state and an absolute value of said AC input at a negative terminal is less than said threshold value;
    b) turning on a body diode of said second controllable switch when said AC input is in said first state and said absolute value of said AC input at said negative terminal is greater than said threshold value;
    c) turning on said first controllable switch when said AC input is in said third state and said absolute value of said AC input at a positive terminal is less than said threshold value; and
    d) turning on a body diode of said second controllable switch when said AC input is in said third state and said absolute value of said AC input at said positive terminal is greater than said threshold value.

9. A load driving circuit, comprising:
    a) an input capacitor coupled to an AC power supply and an AC input of a rectifier circuit, wherein said rectifier circuit comprises first and second rectifier circuits;
    b) an output capacitor coupled to said rectifier circuit and a load circuit;
    c) a control circuit configured to turn off a first controllable switch and turn on a second controllable switch when said AC input is in a first state, wherein said first state comprises said AC input being in a positive half cycle and increasing, or said AC input being in said positive half cycle and decreasing while being at least as high as a predetermined threshold value;

d) said AC input being configured to supply power to a load circuit and an output capacitor via said first rectifier circuit when said AC input is in said first state, wherein said first rectifier circuit comprises a first diode and said second controllable switch;

e) said control circuit being configured to turn on said first and second controllable switches and use said output capacitor to supply power to said load circuit when said AC input is in a second state, wherein said second state comprises said AC input being in positive half cycle and decreasing to less than said threshold value;

f) said control circuit being configured to turn on said first controllable switch and turn off said second controllable switch when said AC input is in a third state, wherein said third state comprises said AC input being in a negative half cycle and having an absolute value increasing, or said AC input being in said negative half cycle and having said absolute value decreasing and at least as high as said threshold value;

g) said AC input being configured to supply power to said load circuit and said output capacitor via said second rectifier circuit when said AC input is in said third state, wherein said second rectifier circuit comprises a second diode and said first controllable switch; and h) said control circuit being configured to turn on said first and second controllable switches and use said output capacitor to supply power to said load circuit when said AC input is in a fourth state, wherein said fourth state comprises said AC input being in said negative half cycle and having an absolute value decreasing to be less than said threshold value.

10. The load driving circuit of claim 9, wherein said control circuit comprises:
    a) an AC input judging circuit configured to determine a state of said AC input;
    b) a threshold value control circuit configured to activate a comparison flip-flop signal when an absolute value of said AC input is less than said threshold value; and
    c) a first logic circuit coupled to said AC input judging circuit and said threshold value control circuit, wherein said first logic circuit is configured to control said first and second controllable switches according to said determined state of said AC input and said comparison flip-flop signal.

11. The load driving circuit of claim 10, wherein said control circuit further comprises:
    a) a load driving feedback circuit coupled to said load circuit, and being configured to monitor said load circuit in real-time to determine a present load driving signal;
    b) a load feedback control circuit coupled to said load driving feedback circuit and said first logic circuit, and being configured to activate an interrupt control signal to said first logic circuit to maintain said second controllable switch as on, and to turn off said first controllable switch until said AC input enters said third state when said AC input is in said second state and if said present load driving signal is less than said predetermined driving signal; and
    c) said load feedback control circuit being configured to activate said interrupt control signal such that said first logic circuit maintains said first controllable switch as on, and turns off said second controllable switch until said AC input enters said first state when said AC input is in said fourth state and if said present load driving signal is less than said expected driving signal.

12. The load driving circuit of claim 10, wherein said first logic circuit comprises:

a) a flip-flop having a set terminal coupled to said threshold value control circuit to receive said comparison flip-flop signal, a reset terminal coupled to said load drive feedback control signal to receive said interrupt control signal, and an output terminal coupled to a logic sub-circuit; and b) said logic sub-circuit having a first input terminal coupled to said AC input judging circuit, an output terminal coupled to said first and second controllable switches, wherein said logic sub-circuit is configured to control said first and second controllable switches according to a state of said AC input and an output of said flip-flop.

13. The load driving circuit of claim 12, wherein said load feedback control circuit comprises:
    a) a ramp generating circuit configured to turn on a third controllable switch when said AC input is in said second state or said fourth state, wherein said ramp generating circuit comprises a DC current configured to charge a charging capacitor via said third controllable switch, and said charging capacitor is configured to output a ramp voltage;
    b) a compensation signal generating circuit configured to generate a compensation voltage according to an error value between said load driving feedback signal and said expected voltage; and
    c) a fourth comparator configured to generate said interrupt control signal based on a comparison of said ramp voltage against said compensation voltage.

14. The load driving circuit of claim 10, wherein said threshold value comprises a voltage of about 0V.

15. The load driving circuit of claim 10, further comprising:
    a) a short-circuit protection circuit configured to compare an output voltage of said output capacitor against a predetermined voltage lower limit, and to generate a short-circuit protection signal; and
    b) a first AND-gate configured to receive an output from said short-circuit protection circuit, an output from said threshold value control circuit, and to provide a signal to a set terminal of said flip-flop.

16. The load driving circuit of claim 10, further comprising:
    a) an open-circuit protection circuit configured to activate an open-circuit protection signal when an output voltage of said output capacitor is higher than a predetermined voltage upper limit; and
    b) a second AND-gate configured to receive said open-circuit protection signal and said interrupt control signal, and to provide a signal to a reset terminal of said flip-flop.

17. The load driving circuit of claim 10, further comprising an input overvoltage protection circuit having:
    a) a fourth controllable switch coupled between said rectifier circuit and said output capacitor; and
    b) a fifth comparator configured to receive an AC input terminal and an input voltage upper limit, and being configured to turn off said fourth controllable switch when an absolute value of said AC input is greater than said input voltage upper limit.

18. The load driving circuit of anyone of claim 9, wherein each of said first and second controllable switches comprises a metal-oxide-semiconductor field-effect transistor with a body diode.

19. The load driving circuit of claim 18, wherein said control circuit comprises:

a) a threshold value control circuit configured to activate a comparison flip-flop signal when an absolute value of said AC input is less than a threshold value;
b) a flip-flop having a set terminal configured to receive said comparison flip-flop signal, an output terminal coupled to a second logic circuit, wherein said flip-flop is configured to generate a flip-flop signal for said logic sub-circuit;
c) said second logic circuit comprising a third OR-gate configured to control said second controllable switch based on said flip-flop signal, and a comparison result between said AC input and said threshold value; and
d) a fourth OR-gate configured to receive said flip-flop signal, and a comparison result between said AC input and said threshold value, and to output a signal to control said first controllable switch.

* * * * *